US007096265B2

(12) United States Patent
Simpson et al.

(10) Patent No.: US 7,096,265 B2
(45) Date of Patent: Aug. 22, 2006

(54) SYSTEM AND METHOD FOR INTELLIGENT ROUTING OF TASKS ACROSS A DISTRIBUTED NETWORK

(75) Inventors: Shell Sterling Simpson, Boise, ID (US); Ward Scott Foster, Boise, ID (US); Kris R. Livingston, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 725 days.

(21) Appl. No.: 10/035,619

(22) Filed: Dec. 28, 2001

(65) Prior Publication Data

US 2003/0126261 A1    Jul. 3, 2003

(51) Int. Cl.
*G06F 15/16*      (2006.01)
*G06F 15/173*     (2006.01)
*G06F 3/12*       (2006.01)
(52) U.S. Cl. ............... 709/226; 709/217; 358/1.15
(58) Field of Classification Search ......... 709/226, 709/227, 217; 358/1.15, 1.1
See application file for complete search history.

(56) References Cited

U.S. PATENT DOCUMENTS

| 5,461,488 | A  | * | 10/1995 | Witek ................. 358/402 |
| 5,590,245 | A  | * | 12/1996 | Leamy et al. ........ 345/418 |
| 5,768,516 | A  | * | 6/1998  | Sugishima .......... 709/217 |
| 5,974,234 | A  | * | 10/1999 | Levine et al. ....... 358/1.16 |
| 5,991,846 | A  | * | 11/1999 | Ooki ................. 710/241 |
| 6,020,973 | A  | * | 2/2000  | Levine et al. ....... 358/1.15 |
| 6,321,231 | B1 | * | 11/2001 | Jebens et al. ....... 707/104.1 |
| 6,327,045 | B1 | * | 12/2001 | Teng et al. ......... 358/1.15 |
| 6,337,745 | B1 | * | 1/2002  | Aiello et al. ....... 358/1.15 |
| 6,498,656 | B1 | * | 12/2002 | Mastie et al. ....... 358/1.15 |
| 6,529,286 | B1 | * | 3/2003  | King ................. 358/1.14 |
| 6,573,910 | B1 | * | 6/2003  | Duke et al. ......... 715/740 |
| 6,757,071 | B1 | * | 6/2004  | Goodman et al. ..... 358/1.13 |
| 6,762,852 | B1 | * | 7/2004  | Fischer ............. 358/1.15 |
| 2002/0116291 | A1 | * | 8/2002 | Grasso et al. ....... 705/27 |
| 2003/0093525 | A1 | * | 5/2003 | Yeung et al. ........ 709/225 |

FOREIGN PATENT DOCUMENTS

WO    WO 97/32274    * 9/1997

* cited by examiner

*Primary Examiner*—Rupal Dharia
*Assistant Examiner*—Brian J. Gillis

(57) ABSTRACT

An improved system and method for recommending a service are disclosed. A data translation system may comprise a server and a computing device. In preferred embodiments, executable logic and descriptors reflective of data designated for transformation by a hard-copy generation device and in response to the logic recommends a suitable service for completing the transformation. A method for intelligently routing hard-copy generation tasks, can be summarized by the following steps: accessing imaging service data; accessing imaging data; recommending at least one capable service; and initiating a hard-copy generation request.

15 Claims, 8 Drawing Sheets

SYSTEM AND METHOD FOR INTELLIGENT ROUTING OF TASKS ACROSS A DISTRIBUTED NETWORK

TECHNICAL FIELD

The present disclosure relates to systems and methods for processing digital data. More particularly, the invention relates to systems and methods that intelligently route tasks to devices having appropriate resources and capabilities to complete desired data transformations.

BACKGROUND OF THE INVENTION

As computer technology has advanced, the role of computers in our daily lives has expanded, as has the need for various peripheral support devices. One typical peripheral device used with computers is a printer, which generates hard copies of electronic data. The types and capabilities of available printers are also expanding, resulting in a variety of printers with a range of printing capabilities, performance, and price.

One significant expansion in the use of computer technology is the networking of computers. The networking of computers allows the interconnected computers to communicate with one another, as well as with other devices, such as printers. As computer networks, such as the Internet, continue to develop, there is an increasing demand for additional and improved functions that expand and exploit the potential of computer networks.

Despite the printing facilities now available due to computer networking, there still is a need for efficient and convenient printing services, as well as efficient printing resource management. Although some printing solutions exist, each is lacking in one respect or another.

For example, with one such solution, entire documents to be printed must be uploaded to a remote service to determine an appropriate fee for printing the document. This uploading can be time-consuming, particularly for large documents, and wasteful where the user determines not to print the document because he or she considers the expense too great or the capabilities of the remote service lacking.

Concerning print solution management, operators of network connected computing devices are often presented multiple print destination devices for each print task associated with a particular application. Often operators are unaware of the respective print rates and other capabilities of the various available printing devices. The resulting lack of information regarding the capabilities of the available printing devices can often lead to unnecessary operator frustration caused by frequent printing bottlenecks and repeat tasking of misrouted print jobs.

SUMMARY OF THE INVENTION

In response to these and other shortcomings of the prior art, systems and methods for intelligent routing of printing tasks are disclosed. Briefly described, in architecture, an intelligent routing system can be implemented with a server and a computing device. In some embodiments, executable logic and descriptors are used to extract information reflective of data designated for transformation by a hard-copy generation device. In response to the descriptors, the logic presents one or more suitable services for completing the transformation. Other embodiments may contain logic configured to recommend particular services. The logic identifies recommended services based on extracted information and/or user preferences.

Some embodiments of the intelligent routing system can be viewed as providing methods for assisting a user in selecting a hardcopy generation service to perform a hardcopy generation task. In this regard, a method for assisting a user in selecting a hardcopy generation service can be summarized by the following steps: accessing imaging data; formulating at least one criterion reflective of the imaging data; accessing information reflective of a plurality of hardcopy generation services; using the at least one criterion to identify hardcopy generation services; and presenting the identified hardcopy generation services to the user.

Other systems, methods, and features associated with intelligent routing will become apparent to one with skill in the art upon examination of the following drawings and detailed description. It is intended that all such additional systems, methods, and features included within this description, are within the scope of the system and method for intelligent routing as protected by the accompanying claims.

BRIEF DESCRIPTION OF THE DRAWINGS

The system and method for intelligent routing can be better understood with reference to the following drawings. The components in the drawings are not necessarily to scale, emphasis instead is placed upon clearly illustrating the principles of intelligent routing of printing tasks. Moreover, in the drawings, like reference numerals designate corresponding parts throughout the several views.

DETAILED DESCRIPTION

Figure 1:
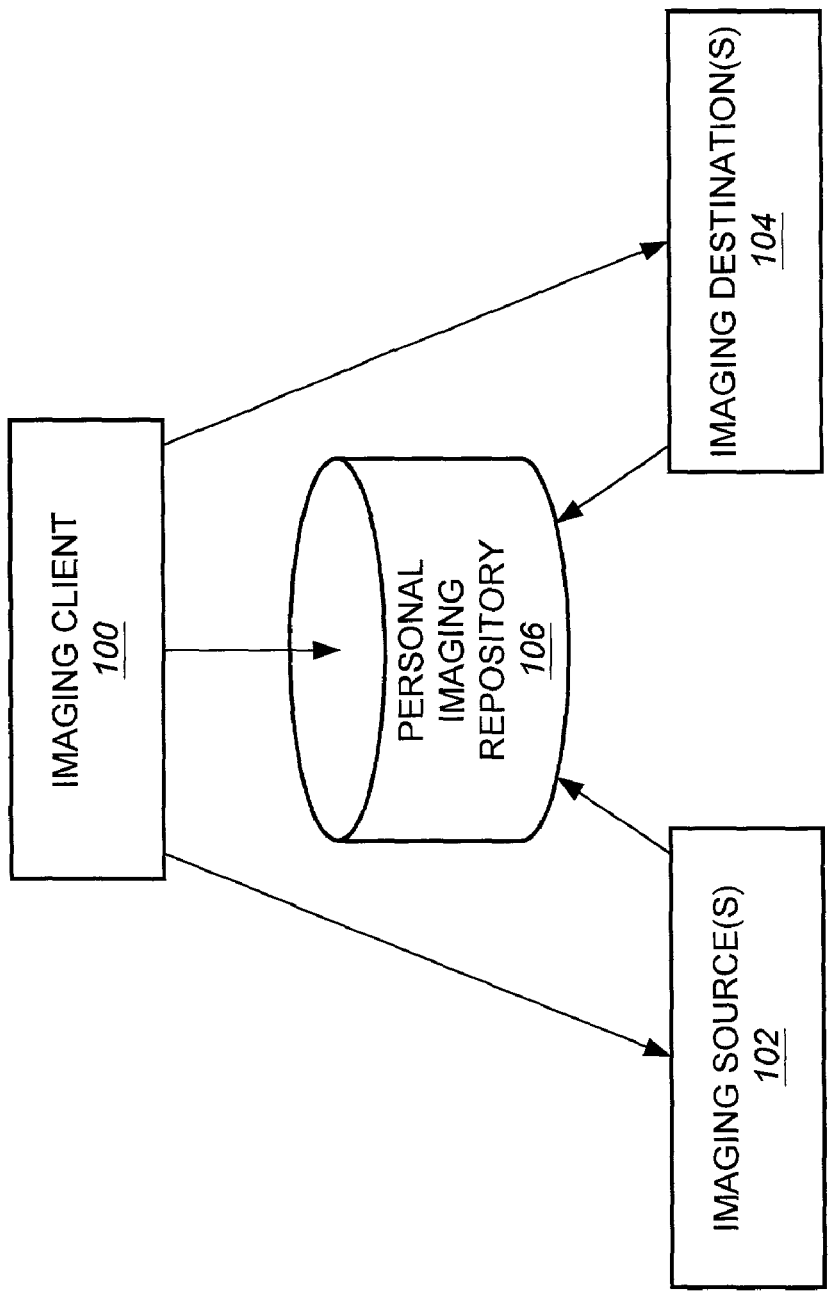
FIG. 1 is a schematic illustrating the general operation of the system and method for intelligent routing.

Various aspects of the system and method for intelligent routing, having been summarized above, reference will now be made in detail to the description of the exemplar systems and methods for intelligent routing as illustrated in the drawings. While the systems and methods for intelligent routing will be described in connection with these drawings, there is no intent to limit it to the embodiment or embodiments disclosed therein. On the contrary, the intent is to cover all alternatives, modifications, and equivalents included within the spirit and scope of the systems and methods for intelligent routing as defined by the appended claims.

Generally, the system has a distributed architecture with which a user can maintain data in a personal imaging repository. Various printing devices, services representing printing devices, among other services in accordance with information extracted from the underlying images, may controllably access data in the personal imaging repository. Generally, a destination service accesses imaging information available through a user's personal imaging repository. This imaging information can be accessed in a variety of forms because the imaging information is accessed through a collection of methods (i.e., a programmatic interface) that enables the destination service to negotiate the preferred form in which it wishes to receive the data.

In preferred arrangements, the user accesses a network-based or web-based imaging service that enables the user to access the imaging data in the user's personal imaging repository, as well as arrange the imaging data as desired. An imaging source service doesn't necessarily have to access a personal imaging repository before contributing imaging information (including the arrangement of imaging information, which, in a sense, is just another kind of imaging information) to the user's personal imaging repository. An imaging source service generates imaging data that is added to the users personal imaging repository. This can be accomplished by the user inputting data, the user arranging existing data already in their personal imaging repository, as well as by other methods. Thus "imaging data" is associated with the user in question, so that imaging destination services can subsequently use user specific data.

Once the arrangement has been completed, a document can be stored in the user's personal imaging repository and, as desired, a web-based imaging print management server can be accessed to formulate a recommended print service destination based on one or more hard copy parameters extracted from the data in the personal imaging repository. The recommended print service destination may be a local (i.e., a local area network connected) device or a remote (i.e., a wide area network connected) device. In alternative embodiments, the service may be embedded within the print device or may operate on a server separate and distinct from the print device. It should be appreciated that in the case where the recommended print service destination is a remote device, the user may be interfacing with a third party that may provide network-based or web-based printing services in exchange for payment of a fee.

FIG. 1 is a schematic representation of the general operation of the systems and methods for intelligent routing. As shown in this figure, an imaging client 100 communicates with one or more imaging sources 102, one or more imaging destinations 104, and a personal imaging repository 106. The imaging source(s) 102 represent any of a variety of devices/services that can be accessed by the imaging client 100 and used to select or identify imaging data that may be used to create a hard copy product (e.g., a text document, a photo, a map, or other images).

The personal imaging repository 106 provides image storage facilities that typically are personalized for the individual imaging client 100. The imaging repository 106 can be located in various places. For example, the repository 106 can be maintained on one or more computing devices associated with the imaging client 100, imaging source(s) 102, or imaging destination(s) 104. Alternatively, the repository 106 can be maintained on a separate computing device (e.g., a file server) that the imaging client 100, imaging source(s) 102, and imaging destination(s) 104 can access. The data in the imaging repository 106 can be any type of printable data, such as text, graphics, video frames, animations, photographs, and/or combinations thereof.

Once data is stored in the personal imaging repository 106, the imaging client 100 can select data from the repository that is intended to be communicated to the imaging destination(s) 104 for some form of processing or manipulation. By way of example, the data may be transmitted to the image destination(s) 104 for printing. Where the imaging destination(s) 104 are adapted for printing, they may comprise any of a wide variety of printing devices that are capable of generating hard copy products, such as printers, multi-function peripherals (MFPs), plotters, services managing printing devices, and others.

As will be apparent from the discussions that follow, the above-described manner of operation provides a high degree of personalization to the imaging client 100. Specifically, in that the client's personal information can be accessed and utilized with any participating service (e.g., web site) accessible by the client, each accessible service can be "customized" based on the underlying data for each particular user.

Figure 2:
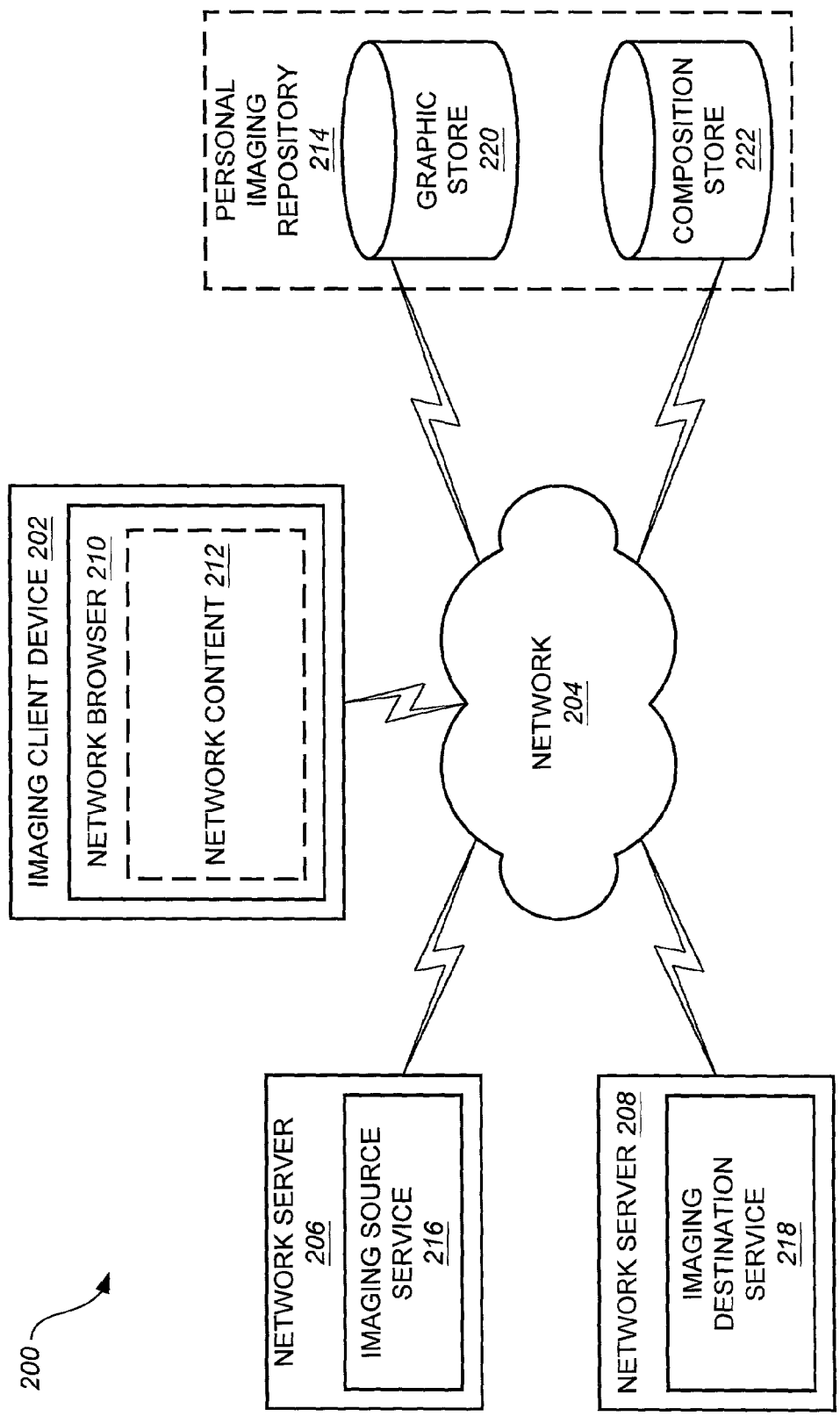
FIG. 2 is a schematic diagram illustrating a distributed system in which the system and method for intelligent routing of FIG. 1 may be realized.

FIG. 2 illustrates an exemplar-distributed system 200 in which the systems and methods for intelligent routing can be implemented. As indicated in FIG. 2, the system 200 includes an imaging client device 202 that is coupled to a network 204. Through this coupling, the imaging client device 202, and therefore the imaging client (i.e., user), can be placed in communication with one or more network servers, such as servers 206 and 208. The imaging client device 202 and network servers 206 and 208 represent any of a wide variety of wired and/or wireless computing devices, such as desktop computers, portable computers, dedicated server computers, multi-processor computing devices, personal digital assistants (PDAs), mobile telephones, pen-based computers, gaming consoles, and so forth.

The network 204 represents one or more data distribution networks that can be used to communicate data and other information (e.g., control information) between or among various computing devices. Examples for the network 204 include the publicly accessible wide area network (WAN) commonly known as the Internet, a local area network (LAN), other public and/or private WANs, and combinations thereof. The network 204 can further include various different types of networks, including wired and/or wireless portions, employing any of a variety of different communications protocols including public and/or proprietary communications protocols.

During operation, the user can operate a network browser 210 executing on the imaging client device 202 to interact with imaging services 216, 218 executing on the network servers 206 and 208, respectively. As used herein, the term "services" refers to software and/or firmware components that can execute on one or more computing devices and which provide one or more particular functions to the imaging client device 202, such as imaging data selection and arrangement, data manipulation, printing, and others. As indicated in FIG. 2, the network browser 210 can receive network content 212 from one or more of the network servers 206 and 208. This content 212 may include various components such as, for example, text, graphics, commands (e.g., hypertext mark-up language (HTML), Java™, JavaScript™, etc.) and/or applications (e.g., Java™ applets). In use, the content 212 in some arrangements may facilitate communication with a personal imaging repository 214 so that the servers 206 and 208 can access data stored in the personal imaging repository 214. Examples of the ways in which this communication can be facilitated are described below with reference to FIGS. 3 and 4.

The network server 206 executes an imaging source service 216 that, among other things, allows the user to interact with his or her personal imaging repository 214. The imaging source service 216 may actually provide multiple services that can be accessed by the user. In some embodiments, these services can provide different functions to the user. For instance, one service may be responsible for graphic storage and retrieval while another service may be responsible for merging graphics in a single document. By accessing these services with the network browser 210, the user can select or identify imaging data that are to be stored as graphics in a graphic store 220 of the personal imaging repository 214. These graphics can be stored as individual files and generally can comprise any data capable of representation as a two-dimensional graphic. As discussed below, the individual graphics in store 220 can be used as individual images that can be printed on appropriate print media, or multiple individual graphics can be compiled together as a single image for printing and/or other methods of generating a hard copy output.

Irrespective of whether multiple graphics are to be used, the imaging source service 216 can be used to arrange the graphic(s) on a visual representation of a document to be created. Once the arrangement has been selected, the imaging source service 216 can store the arrangement as a composition (i.e., a composition image) in a composition store 222 of the personal image repository 214. It is to be noted that, although the graphic store 220 and the composition store 222 are illustrated as two separate stores, multiple such stores may exist in the system 200 and one or more graphic stores 220 may be combined with one or more composition stores 222 as may be desired. Additionally, one or more of these stores 220 and 222 may be implemented on the imaging client device 202, one or more of the servers 206 or 208, or on other designated computing devices (not shown).

Once the graphics and composition have been selected, the image data can be processed or otherwise manipulated by accessing an imaging destination service 218 that executes on the network server 208. Where one or more hard copy products are to be generated, this service 218 can comprise a print service with which document(s) can be printed and/or other hard copy products may be generated. In one such scenario, a print request is communicated to the imaging destination service 218 and, upon receipt of the print request, the network server 208 interacts with the graphic store 220 and composition store 222 to retrieve the data needed to complete the print job. Once these data are retrieved, the network server 208 interacts with one or more printing devices (not shown) to which the server is coupled (directly or indirectly) to generate the hard copy document(s).

Figure 3:
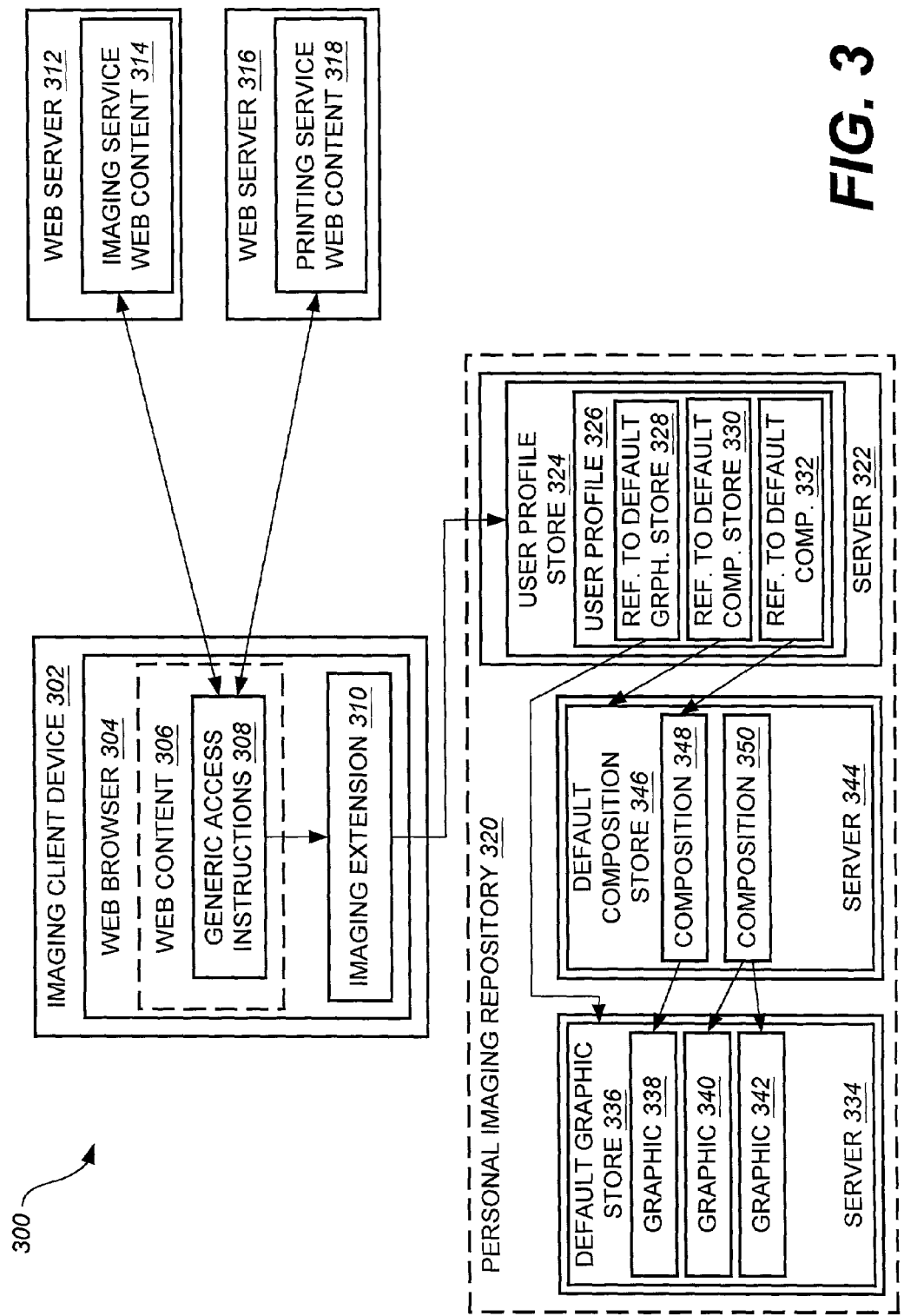
FIG. 3 is a first example of a web-based imaging system in which the system and method for intelligent routing of FIG. 1 may be realized.

FIG. 3 illustrates a first exemplar web-based imaging system 300 in which the systems and methods for intelligent routing can be implemented. As will be appreciated from the discussion that follows, this system 300 can be described as a client-based implementation in that much of the system functionality is provided by a client device. A similar system is described in detail in U.S. patent application Ser. No. 09/924,058, filed on Aug. 8, 2001, entitled "A Method, System and Program Product for Multi-Profile Operations and Expansive Profile Operation," by Shell Simpson, Ward Foster, and Kris Livingston the disclosure of which is hereby incorporated by reference in its entirety into the present disclosure.

As indicated in FIG. 3, the system 300 includes an imaging client device 302. The imaging client device 302 comprises a web browser 304 that is adapted to access web content 306 derived from imaging service web content 314 and printing service web content 318 of web servers 312 and 316, respectively. The web content 306, like content 212, typically comprises text, graphics, and various commands. The commands can comprise one or more sets of executable instructions that are downloaded (i.e., communicated) to the web browser 304 to perform a service requested by the user. These instructions can be written in any suitable language including, for instance, HTML, Java™, JavaScript™, C-sharp, or other appropriate languages. A variety of different functions can be served by the executable instructions. For example, the web content 306 normally includes executable instructions for causing target graphics, i.e. graphics provided by an accessed web site, to be displayed on an input/output device, such as a display monitor in association with the imaging client device 302.

In the embodiment shown in FIG. 3, the executable instructions are further used to access a personal imaging repository 320. These instructions typically comprise system-wide generic access instructions 308 that call on methods of an imaging extension 310 to access the personal imaging repository 320 and perform various web-imaging operations. These instructions 308 are designated as "generic" because they are independent of the configuration of the user's personal imaging repository 320. As discussed in greater detail below, the generic access instructions 308 can be used to, for example, add a graphic to a default graphic store 336 of the personal imaging repository 320, or add a new composition to a default composition store 346 of the personal imaging repository 320.

As is further indicated in FIG. 3, the imaging extension 310 can form part of the browser 304. Although this arrangement is shown in the figure and described herein, the imaging extension 310 can, alternatively, be provided outside of the browser 304, for instance on a different device. Irrespective of its location, however, the imaging extension 310 is configured to respond to the execution of the generic access instructions 308 by generating and/or mapping corresponding imaging client specific commands entered by the user. The imaging extension 310 typically is implemented as one or more application programming instructions (APIs) that, preferably, act as interfaces in accordance with a system-wide standard.

When executed, the generic access instructions 308 cause imaging extension calls (e.g., API calls) to be issued, which in turn, cause the imaging extension 310 (e.g., APIs) to access the user's personal imaging repository 320. The web content 306 therefore uses the imaging extension 310 as a gateway to access the user's personal imaging repository 320. Generally, the APIs can comprise sets of methods for establishing a destination for redirecting the web browser 304 based on some form of received redirection initiation. In such circumstances, the process normally comprises receiving a redirection initiation to redirect the web browser 304, retrieving a direct or indirect reference to a destination, and then causing the web browser 304 to extract information from that particular destination. It will be recognized that there are many other ways (both in hardware and software) to implement this function.

In some arrangements, the imaging extension 310 is configured to prevent the web content 306 (i.e., the executable instructions from one or more web services), from arbitrarily accessing the user's personal imaging repository 320. This restricted access can be imposed upon the web content 306 using a variety of methods. For example, an imaging extension API can be configured to only accept references from the web content 306 that were previously provided by the imaging extension 310. In such a scenario, the content 306 cannot arbitrarily supply references when calling the imaging extension API. Therefore, in order to access the user's personal imaging repository 320, the web content 306 must first obtain references using the imaging extension API.

The imaging extension 310 can be used to access one or more user profiles 326 that is/are stored in a user profile store 324 of a server 322 of the personal imaging repository 320. By way of example, the imaging extension 310 can be directed to the user profile 326 with a uniform resource locator (URL), pointer, socket, or other detail. In some embodiments, the same user can have multiple user profiles. This may be particularly advantageous when a firewall (not shown) is encountered. When firewalls are encountered, different graphic stores and composition stores can be accessed depending on whether the user is inside or outside of the firewall.

The user profile 326 typically includes references to all or a portion of the personal imaging repository 320 for that user profile. For instance, as shown in FIG. 3, the user profile 326 can include a reference 328 to a default graphic store, a reference 330 to a default composition store, and a reference 332 to a default composition. In use, the user profile store 324 functions as a service that uses appropriate methods to create, modify, access, and cancel profiles. Accordingly, the imaging extension 310 maps to the appropriate methods (i.e., makes use of the methods) in the user profile 326 to obtain the reference to various repository items such as the default graphic store 336 and the default composition store 346.

Like the user profile store 324, the default graphic store 336 and default composition store 346 can reside on separate servers 334 and 344. It will be understood, however, that one or more of the stores could reside on a single machine, if desired. As indicated in FIG. 3, the default graphic store 336 is used to store various graphics, such as graphics 338, 340, and 342. These graphics can be stored in substantially any format. For example, these formats (i.e., file extensions) can comprise PDF, JPEG, PostScript, TIFF, GIF, BMP, etc. In addition, the default graphic store 336 can include a programming interface consisting of a number of methods. Because the default graphic store 336 is implemented as a network service, these methods would be accessible through some sort of remote invocation technology such as a remote procedure call (RPC), a simple object access protocol (SOAP), a common object request broker architecture (CORBA), a distributed component object model (DCOM), or others. Therefore, in contrast to merely providing for graphic storage, the graphic store 336 can also provide services used to create, retrieve, and/or manipulate graphics. Furthermore, the default graphic store 336 can communicate with the web content of various web services. For example, printing service web content 318 can submit queries to the default graphic store 336 (via the extension 310) about a print job, as well as request that one or more graphics be transmitted in a desired arrangement to optimize printing performance.

The default composition store 346 stores various compositions, such as compositions, 348 and 350, which can be used to arrange the selected graphics. Like the user profile store 324 and default graphic store 336, the default composition store 346 can also comprise various programming interfaces consisting of a number of methods that can be used to access graphics from the graphic store, manipulate the graphics, etc.

Figure 4:
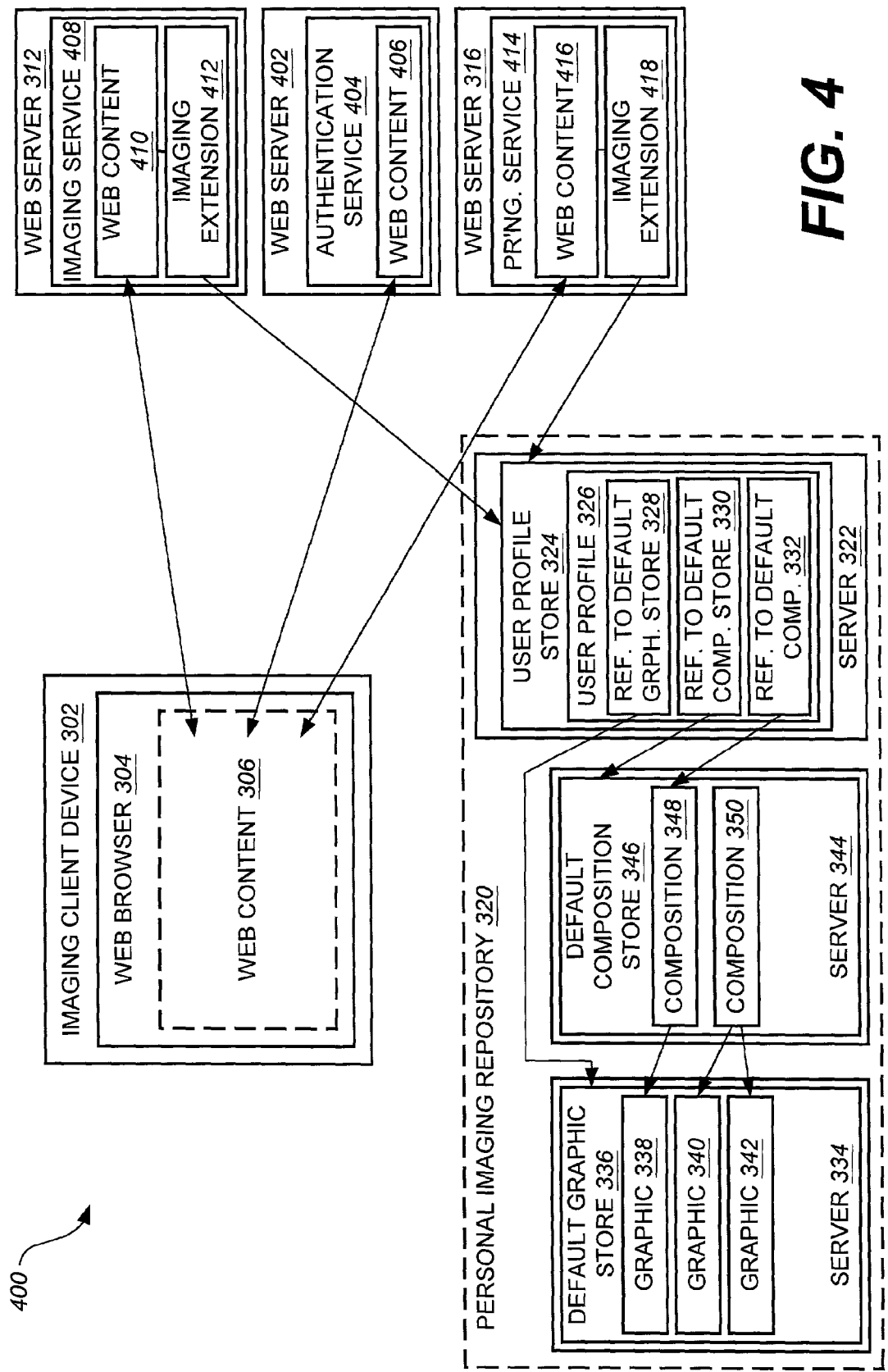
FIG. 4 is a second example of a web-based imaging system in which the system and method for intelligent routing of FIG. 1.

FIG. 4 illustrates a second exemplar web-based imaging system 400 in which the systems and methods for intelligent routing can be implemented. As indicated in FIG. 4, the system 400 includes many of the features of the system 300 shown in FIG. 3. Therefore, the system 400 includes an imaging client device 302 that executes a web browser 304 to receive web content 306. The system 400 also includes a personal imaging repository 320 that can, for instance, comprise a user profile store 324, a default graphic store 336, and a default composition store 346. Furthermore, the system 400 includes web servers 312 and 316. Each of these components is generally configured in a similar manner as the like-named and numbered features identified in FIG. 3. However, unlike the client-based system 300, the system 400 provides a server-based implementation in which many of the functions provided by the client device 302 in the system 300 are transferred to another device. By way of example, this other device can comprise a further web server 402, which executes an authentication service 404. As shown in FIG. 4, the authentication service 404 comprises web content 406 that can be downloaded into the user's browser 304.

In addition to the above-noted differences, the servers 312 and 316 are provided with different software in the system 400 to permit alternative modes of operation. By way of example, the web server 312 can execute an imaging service 408, which includes web content 410 and an imaging extension 412. Similarly, the web server 316 can execute a printing service 414 that includes web content 416 and an imaging extension 418. Like the web content 314 and 318 of the system 300, the web content 410 and web content 416 typically comprise text and graphics that can be downloaded into the user's browser 304. Unlike the system 300, however, generic access instructions need not be downloaded into the browser 304 in that the browser does not comprise its own imaging extension. Such an arrangement is advantageous where the imaging client device 302 has limited storage capacity (e.g., for PDAs, mobile telephones and other similar devices). Instead, as identified above, the services 408 and 414 include their own imaging extensions 412 and 418, respectively, that can be used to access the user's personal imaging repository 320. By way of example, the web content 410 and 416 comprise server-side code including one or more of personal home page (PHP) or personal home hypertext preprocessor (server-side scripting language scripts, Java™ Servlets, Java™ server pages (JSPs), active server pages (ASPs), etc.

Each of the imaging extensions 412 and 418 typically has configurations that are similar to that of the imaging extension 310 (FIG. 3). Therefore, the imaging extensions 412 and 418 can comprise one or more programmatic interfaces that include one or more methods that, when invoked, access the user's personal imaging repository 320. Again, the programmatic interfaces can comprise sets of methods for establishing a destination for redirecting the browser 304 based on some form of received redirection initiation. The programmatic interface can include methods that return or make use of, for instance, a URL, pointer, socket, or other detail to facilitate the redirection.

The manner in which the personal imaging repository 320 is accessed by the services in the system 400 will now be discussed with reference to an exemplar scenario. In this example, the user browses to the imaging service 408 using the web browser 304 of the imaging client device 302. Upon reaching the service 408, web content 410 is executed to generate web pages that are downloaded to the web browser 304 (as content 306). For the purposes of this application, a web page refers both to data that is executed within the web server to generate data to be downloaded to the browser, as well as data that is downloaded to and executes within the browser. Presently, the art fails to distinguish between different stages of web page generation. The terms "server-side" and "client-side," however, are often used to distinguish where web page related execution occurs. Once the content 306 is received, the browser 304 is redirected by the content 306 to the authentication service 404 that resides on the web server 402. Typically, this is accomplished by the web content 410 through the creation of a hypertext transfer protocol (HTTP) redirect that when downloaded to the browser 304, causes the browser to redirect to an address (e.g., URL) identified in the header entry. Web content 410 is then downloaded to the web browser 304 and the user is provided with an opportunity to complete an authentication procedure that identifies both the user's identity and the location of the user's personal imaging repository 320. The authentication procedure can, for example, comprise entry of authentication information, such a user name and password that have been registered with the authentication service 404, for example, in a previous session. This information can be entered in a web page generated by the web server 402. In an alternative arrangement, the authentication procedure can comprise the reading of a user identification card, which includes storage media (e.g., magnetic strip) that contains the user's authentication information. Persons having ordinary skill in the art will recognize that many other authentication alternatives exist that may be integrated with the systems and methods for intelligent routing.

Once the user successfully completes the authentication procedure, the browser 304 is again redirected, this time back to the imaging service 408. The redirection address (e.g., URL) redirects the imaging service 408 and may contain information that identifies the user and the user's personal imaging repository 320 (e.g., with a further URL). To avoid continual redirection back and forth, a "cookie" can be stored on the imaging client device 302 that permits the authentication service 404 to validate the user's identity without requiring a further log in. Note that the use of a "cookie" by the authentication service does not eliminate redirection between the imaging service and an authentication service. Such a "cookie" merely eliminates the need to query the user for identification information. A "cookie" could be used by the imaging service to avoid redirection to the authentication services. Once the user's identity information is possessed by the imaging service 408, the service can, when appropriate, make calls to its imaging extension 412 (e.g., programmatic interface calls) to command the imaging extension to access the user profile store 324 of the personal imaging repository 320. Through this access, the imaging service 408 can be used by the user to, for instance, select or identify imaging data to be stored as graphics in the default graphic store 336.

When the printing service 414 is accessed, for example through redirection from the imaging service 408 as when a "print" button is selected, various content is downloaded to the web browser 306. The printing service 414 can then access the default graphic store 336 and default composition store 346 such that the graphics to be printed can be accessed and an intended arrangement of the document obtained. Although the default graphic store 336 and default composition store 346 may be accessed, typically a destination service such as printing service 414 accesses the default composition from the user profile. The default composition determines which graphics are accessed. The default composition may or may not refer to a composition that is located in the default composition store 346.

Figure 5:
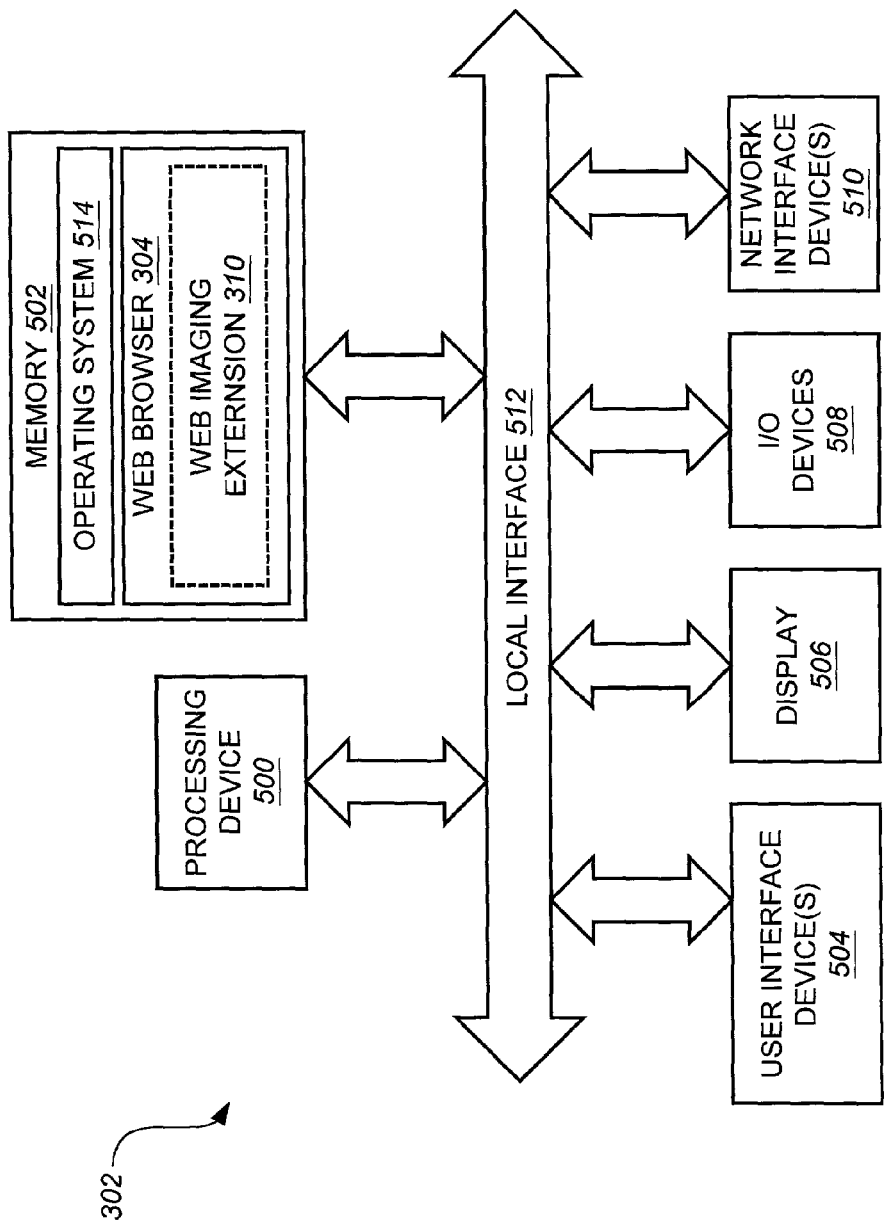
FIG. 5 is a schematic of an imaging client device shown in FIGS. 3 and 4.

Reference is now directed to FIG. 5, which presents a schematic view illustrating an exemplar architecture of the imaging client device 302 introduced in FIGS. 3 and 4. As identified above, the client device 302 can be any one of a variety of wired and/or wireless computing devices, such as desktop computers, portable computers, dedicated server computers, multi-processor computing devices, cellular telephones, PDAs, handheld or pen-based computers, gaming consoles, and others. Irrespective of its type, the client device 302 typically comprises a processing device 500, memory 502, one or more user interface devices 504, a display 506, one or more input/output (I/O) devices 508, and one or more networking devices 510, each of which is connected to a local interface 512. The local interface 512 can be, but is not limited to, one or more buses or other wired or wireless connections as is known in the art. The local interface 512 may have additional elements, such as buffers (caches), drivers, and controllers (omitted here for simplicity), to enable communications. Further, the local interface 512 includes address, control, and data connections to enable appropriate communications among the aforementioned components.

The processing device 500 can include any custom made or commercially available processor, a central processing unit (CPU) or an auxiliary processor among several processors associated with the client device 302, a semiconductor based microprocessor (in the form of a microchip), a macroprocessor, one or more application-specific integrated circuits (ASICs), a plurality of suitably configured digital logic gates, and other well known electrical configurations comprising discrete elements both individually and in various combinations to coordinate the overall operation of the imaging client device 302. The memory 502 can include any one of a combination of volatile memory elements (e.g., random access memory (RAM, such as DRAM, SRAM, etc.)) and nonvolatile memory elements (e.g., ROM, hard drive, tape, CD-ROM, etc.).

The one or more user interface devices 504 comprise those components with which the user can interact with the imaging client device 302. For example, where the imaging client device 302 comprises a personal computer (PC), these components can comprise a keyboard, a mouse, a joystick, etc. Where the imaging client device 302 comprises a handheld device (e.g., PDA, mobile telephone), these components can comprise function keys or buttons, a touch-sensitive screen, a stylus, etc. The display 506 can comprise a computer monitor or plasma screen for a PC or a liquid crystal display (LCD) for a handheld device.

With further reference to FIG. 5, the one or more I/O devices 508 are adapted to facilitate connection of the client device 302 to another device and may therefore include one or more serial, parallel, small computer system interface (SCSI), universal serial bus (USB), IEEE 1394 (e.g., Firewire™), and/or personal area network (PAN) components. The network interface devices 510 comprise the various components used to transmit and/or receive data over a network (e.g., network 204 in FIG. 2). By way of example, the network interface devices 510 include a device that can communicate both inputs and outputs, for instance, a modulator/demodulator (e.g., modem), wireless (e.g., radio frequency (RF)) transceiver, a telephonic interface, a bridge, a router, network card, etc.

The memory 502 generally comprises an operating system 514 and a web browser 304. The operating system 514 controls the execution of other software and provides scheduling, input-output control, file and data management, memory management, and communication control and related services. As noted above with reference to FIGS. 3 and 4, the web browser 304 comprises software and/or firmware that is used to access various services over a network (e.g., Internet) and, therefore, download content from various different sources (e.g., imaging service web content 314, printing service web content 318, web content 406, 410, and 416, etc.). Where the web browser 304 is configured as indicated in FIG. 3, the web browser 304 can comprise an imaging extension 310. However, it will be understood that where the system is arranged as indicated in FIG. 4, the imaging extension 310 need not be provided in the web browser 304.

The architecture of the various servers shown in FIGS. 3 and 4 are typically similar to that described above with reference to FIG. 5. Therefore, separate figures are not provided for these servers. Regardless, however, persons having ordinary skill in the art will recognize the various different architectures that could be used to realize the servers.

The various software and/or firmware described above can be stored on any computer-readable medium for use by or in connection with any computer-related system or method. In the context of this document, a computer-readable medium denotes an electronic, magnetic, optical, or other physical device or means that can contain or store a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

Figure 6:
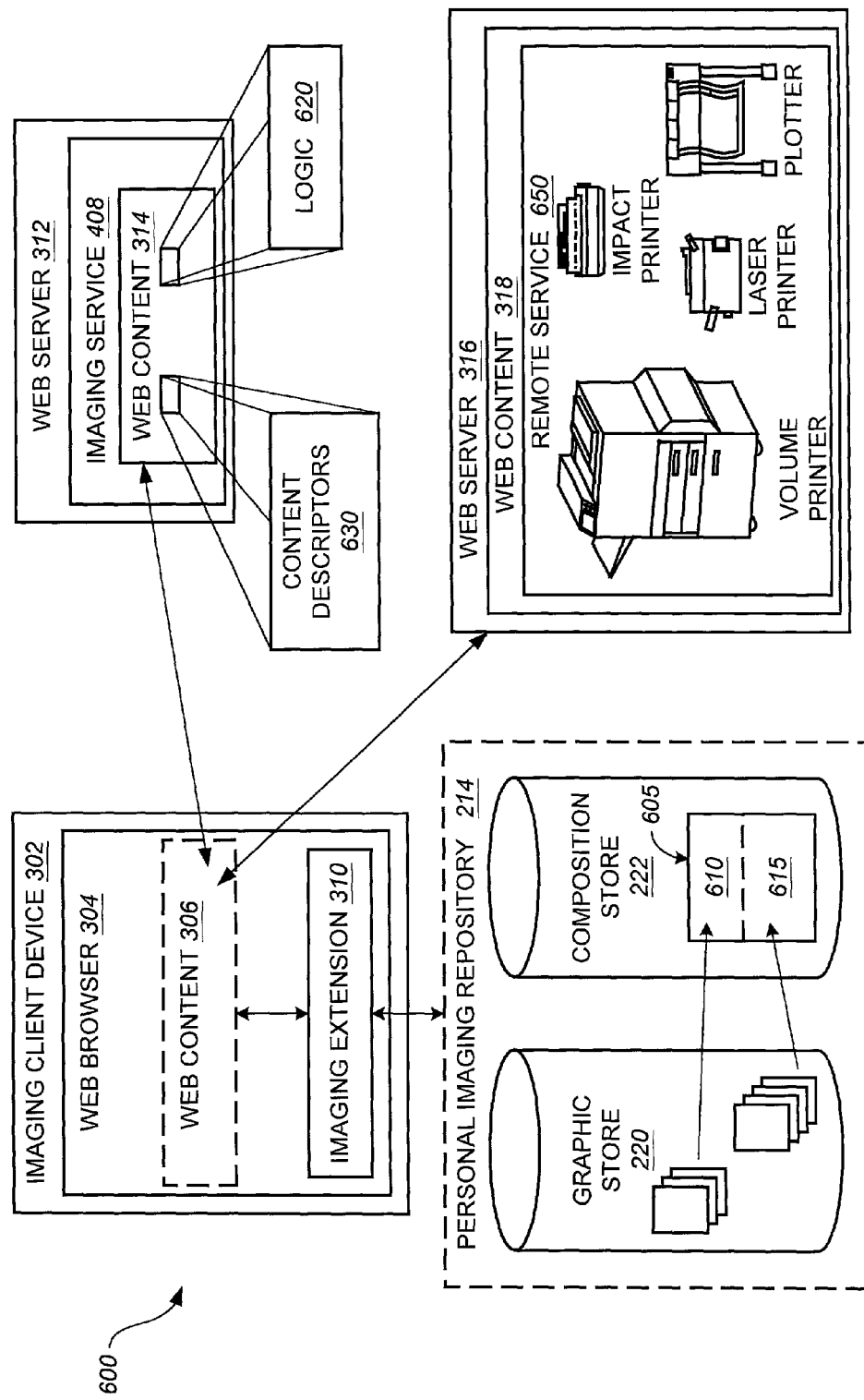
FIG. 6 is a schematic diagram illustrating an exemplar web-based imaging system.

FIG. 6 is a schematic diagram illustrating an exemplar web-based imaging intelligent routing system. As illustrated in FIG. 6, the system 600 includes an imaging client device 302 that is communicatively coupled to a first web server 312 and a second web server 316 via a network (not shown for simplicity of illustration). Through this coupling, the imaging client device 302, and therefore the imaging client (i.e., the user), can be placed in communication with various web content, such as the imaging service web content 314 and the web content 318. The imaging client device 302 and the web servers 312 and 316 represent any of a variety of wired and/or wireless computing devices, as previously described.

During operation, the user can operate the web browser 304 executing on the imaging client device 302 to interact with the imaging service web content 314 and the web content 318 executing on the web servers 312 and 316, respectively. In this example, web server 316 encompasses and provides accesses to a host of hard-copy generation services via remote service 650. As illustrated in the schematic of FIG. 6, the remote service 650 may be configured to provide high-quality high-volume printing, plotting, color printing, impact printing, among other services, as desired by users interacting with the system 600 via the imaging client device 302.

As indicated in FIG. 6, the web browser 304 can receive imaging service web content 314 in the form of logic 620 and content descriptors 630 from web server 312. The logic 620 may include various modules for analyzing information recoverable from documents, photographs, and/or other data in the user's personal imaging repository 214. For example, the logic 620 may observe a particular composition 605 within the composition store 222 of the user's personal imaging repository 214. As shown in the schematic, the composition 605 may include a first document 610, X pages in length and a second document 615, Y pages in length. Those skilled in the art will appreciate that various combinations of multiple documents of varying length, photographs, maps, etc. may be defined in the composition 605.

In this example, the logic 620 is configured to search the composition 605 for a plurality of content descriptors 630. The content descriptors 630 may include a host of parameters regarding the nature of the data in the composition 605 that may be useful in formulating a recommendation as to both a capable remote service 650, as well as a particular hard copy resource suitable for completing the user's hard-copy generation task. When the composition 605 contains a plurality of documents 610, 615 and under circumstances when composition 605 does not contain a plurality of documents, the content descriptors 630 may include the total number of pages, the number of graphic sources (i.e., two), an indication if the graphic store(s) are local or remote, page size (i.e., 8½"×11"), an indication if there is page size uniformity across the multiple graphic sources, an indication if either of the documents requires color, the composition page orientation, an indication of the coverage (i.e., print density), among others. The logic 620 is configured to analyze the composition 605 in light of the content descriptors 630 in order to identify one or more recommended remote service(s) 650 to perform a particular hard-copy generation task desired by the user. Other logic, which is not depicted in FIG. 6, is responsible for analyzing the composition 605 in order to formulate the content descriptors 630. As previously noted, the composition 605 may be accessed through the use of content operating within the browser 304 as described in FIG. 3 or through the use of content operating within the web servers 312, 316 as described in FIG. 4. Typically, the composition 605 will be analyzed on the imaging client device 302 or on the servers 312, 316 depending on where the composition 605 is accessed.

The logic 620 may also be configured with modules for providing an interface to convey information concerning the recommended remote service(s) 650 to the user via web browser 304 operating on the imaging client device 302. In the case where the remote service 650 is a third party, the logic 620 may present an interface that includes a price list, a quality endorsement, along with a comparison of the closest competition.

In some preferred embodiments, the remote service 650 may be a local document services office associated with the user's enterprise. In these preferred embodiments, relatively noisy impact printers, high volume printers, plotters and the like may be segregated from reception areas, office areas, and other areas where it may be desirable to reduce the level of background noise. In these preferred embodiments, the interface may include the location of the recommended resource and the next closest alternatives (e.g., the high-volume color printer in the $12^{th}$ floor print center, the color laser in the $12^{th}$ floor print center, etc.) along with an indication of whether the recommended resources are on-line. Although depicted as a single service, it should be noted that several distinct remote services may exist and imaging service 314 may include these services among possible services to recommend.

In preferred embodiments, the logic 620 is configured by a system administrator familiar with the hard-copy generation requirements of the user's particular enterprise and familiar with the capabilities of each of the hard-copy generation resources integrated with the system 600. In this way, the system 600 provides a seamless solution for recommending a hardcopy resource while allowing the user flexibility to control the hard-copy generation task. In some embodiments, the hardcopy service may provide access to one or more other hardcopy resources as by way of a URL or other suitable method. Flexibility is provided because the user is able to choose among several available hardcopy services and their respective resources. In preferred embodiments, an interface presents available hard copy generating resources in addition to one or more recommended resources. The interface is configured to permit the user to select either a recommended or an alternative resource.

Exemplar systems having been described above, sample methods for configuring recommendation logic and for recommending a service will now be discussed. In this regard, the following discussions describe steps illustrated in the flowcharts of FIGS. 7 and 8. It should be understood that any process steps or blocks in these flowcharts may represent modules, segments, or portions of code that include one or more executable instructions for implementing specific logical functions or steps in the associated process. It should be appreciated that although particular process steps are described, alternative implementations are feasible. Moreover, some method steps may be executed out of order from that shown or discussed, including substantially concurrently or in reverse order, depending on the functions involved.

Figure 7:
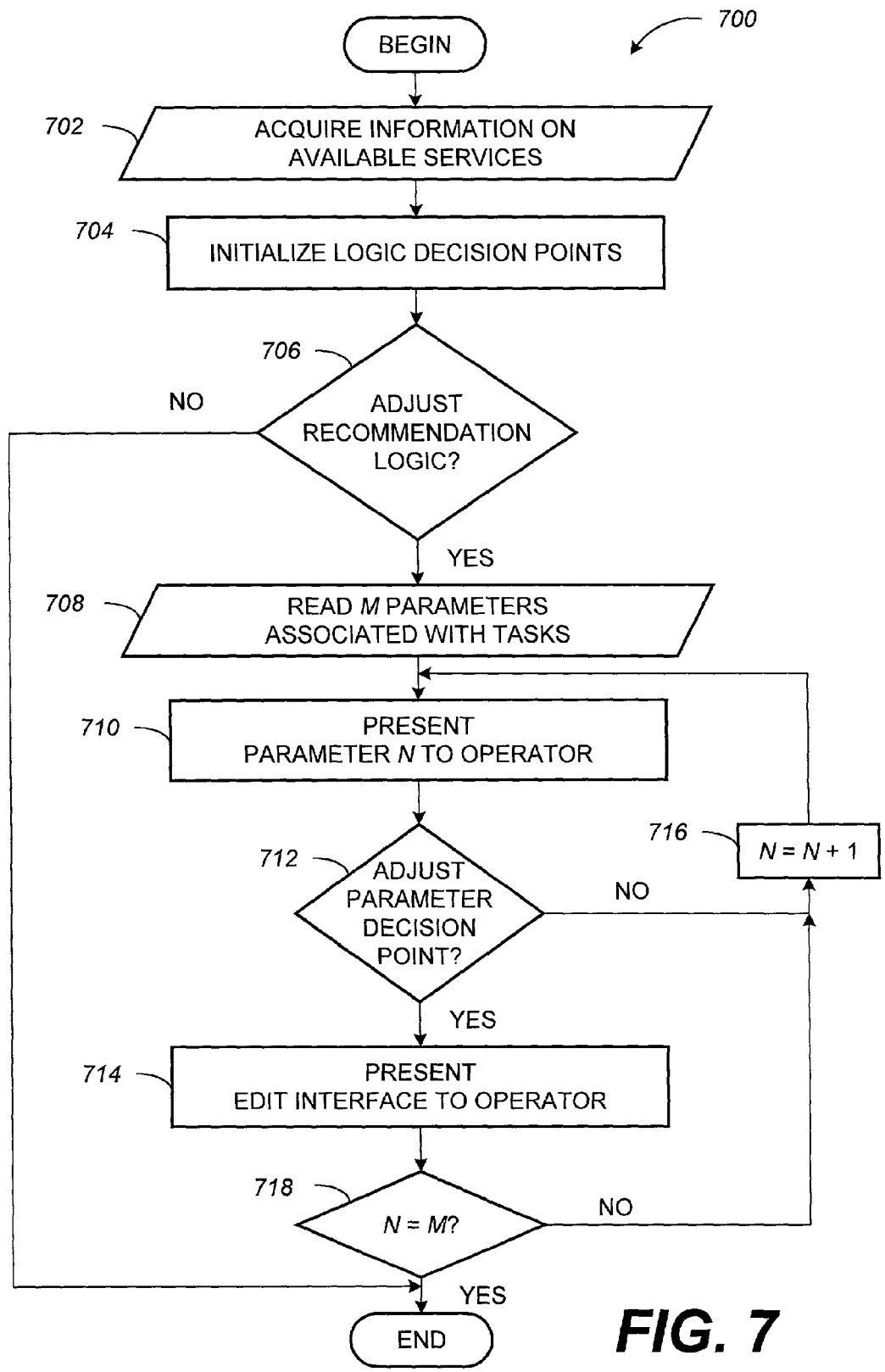
FIG. 7 is a flowchart illustrating a method for configuring recommendation logic for intelligent routing of print tasks that may be used in the web-based imaging system of FIG. 6.

Reference is now directed to FIG. 7, which presents a flowchart illustrating a method for configuring recommendation logic for intelligent routing of print tasks 700 that may be used in the web-based imaging system of FIG. 6. In this regard, a system administrator practicing the method 700 may begin by acquiring information concerning one or more available services (e.g., the remote service 650 (FIG. 6)) that is presently or soon to be integrated with the network 204 (FIG. 2) as illustrated in step 702. This may be accomplished manually or automatically. The information acquired may concern resources, capabilities, volume, processing rates, fees, and the like.

Next, as shown in step 704, the system administrator or other operator with appropriate access to the logic 620 within web content 314 (FIG. 6), as well as information regarding the available services and the specific resources under their control, and some knowledge about the needs of a user can initialize and/or otherwise configure the web content 314. It should be understood that by "initialize" it is meant that a system administrator or other entity provides information used in the formation of the web content 306 delivered to browser 304 by web server 312.

Note that in some preferred embodiments, this initialization may take the form of a default configuration of a set of available hardcopy services selected in response to various parameters commonly associated with a particular hardcopy generation task. For example, a default configuration may be associated with a print request for greater than 30 stapled non-color copies on 8½"×11" bond of a company proprietary document. In accordance with the instruction of the system administrator, the default configuration in this case may be to route the print task to a capable volume printer located within a company owned and operated copy center in the same building with the imaging client device 302 that generated the request. By way of further example, a separate default configuration may be associated with a request to provide color transparencies. This second default configuration may include information directing the hard-copy generation task to a remote service 650 that has a suitable resource and the transparency medium to complete the task. Thus, a plurality of default configurations may be pre-loaded in order to address specific hard-copy generation tasks.

As described above and as illustrated in step 704 of FIG. 7, this configuration may take the form of setting a plurality of recommendation decision points based on one or more content descriptors 630 (FIG. 6) that may be used to characterize the nature of the data and/or the nature of the contemplated data translation (i.e., the processing to be performed). The content descriptors 630, when describing the nature of the data, may take the form of data type (e.g., document, photo, among others), coverage, color, etc. When describing the nature of the contemplated data translation, the content descriptors 630 may include printed page size, orientation, fonts, and the like.

In some preferred embodiments, the system administrator is presented with a configuration interface that steps the administrator through a number of operations that may be taken to modify the logic 620 (FIG. 6). As indicated in step 706, the logic 620 may be configured to present a query to the administrator. The query may prompt the administrator whether it is desirable to adjust the recommendation logic. For example, the administrator may determine that print tasks of less than 30 pages should be sent to a local area network connected laser printer capable of printing 45 pages per minute, whereas print tasks of 30 or more pages should be forwarded to a remote service 650. A host of other recommendation decision points can be realized as well such that the logic 620 responds to various hard-copy generation requests with a recommendation to the user of appropriately configured resources to complete the requested task. When the response to the query is negative, the configuration interface may terminate the method for configuring recommendation logic 700 as is shown by the "NO" flow control arrow that exits the query of step 706.

Otherwise, when the system administrator indicates that it is desirable to adjust the recommendation logic (e.g., logic 620), the interface may proceed by reading a host of parameters as indicated in step 708. The various parameters associated with the underlying task are gathered for presentation to the administrator as illustrated in step 710. While the present illustration and description of the method for configuring recommendation logic 700 reveals a serial presentation and adjustment process, those skilled in the art will appreciate that a host of other implementations may be used to reach the desired result. For example, the presentation of pertinent configuration parameters may occur substantially simultaneously via an interactive graphical user interface (GUI) that may present each of the logic decision points or a portion of the logic decision points associated with the content descriptors 630. By way of further example, the GUI may present logic decision points in groups and/or may remove various logic decision points from a presentation state in response to one or more previous selected options.

As illustrated in step 712, the logic 620, may present the administrator with one or more methods for indicating that the administrator desires to adjust the logic decision point related to the $N^{th}$ parameter. When the administrator determines that the decision logic point should not be altered, the logic 620 may be configured to present the next logic decision point as occurs when steps 716 and 710 are repeated as indicated by the "NO" branch that exits the query of step 712. Otherwise, the logic 620 may be configured to allow the administrator to edit the present logic decision point as illustrated in step 714. Thereafter, in step 718, the logic 620 may make a determination if further logic decision points related to further processing parameters are to be presented to the administrator for edit consideration. When further logic decision points are to be presented as indicated by the "NO" branch that exits the query of step 718, steps 716, and 710 through 718 are repeated until all decision logic points have been configured. Those skilled in the art will appreciate that after the logic has acquired the parameters associated with the particular task of interest as indicated in step 708 that the logic 620 can present an administrator editable GUI that together with the interaction of the administrator through one or more input/output devices permits the substantially concurrent performance of steps 710 through 718.

Figure 8:
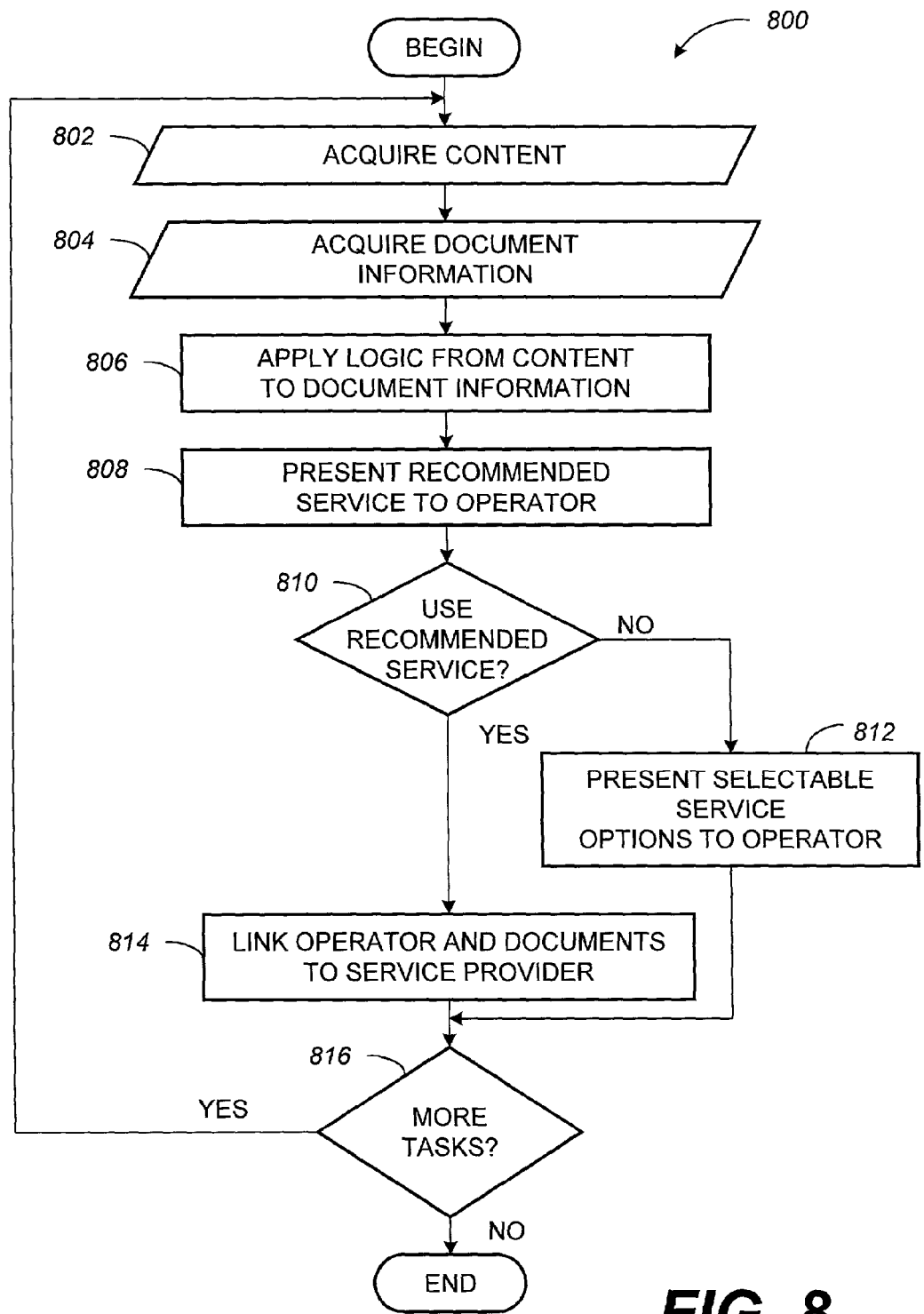
FIG. 8 is a flowchart illustrating a method for recommending available services that may be realized by the web-based imaging system of FIG. 6.

Reference is now directed to the flowchart of FIG. 8, which presents a method for recommending a service for intelligent routing of print tasks 800 that may be realized in the web-based imaging system 600 of FIG. 6. In this regard, a web browser such as the imaging client device web browser 304 (FIG. 6) may acquire imaging service content from web server 312 (FIG. 6) as indicated in step 802. Next, the web browser 304 (FIG. 6) may use logic transferred in the imaging service content 314 associated with remote web server 312 to acquire information about documents stored in a personal imaging repository 214 as illustrated in step 804. After having received the logic 620 and the content descriptors 630 required to both extract and make a recommendation of an appropriately configured remote service 650 based upon the underlying data and hard-copy generation task desired in steps 802 and 804, the web browser 304 may be configured to apply the extracted data to a plurality of logic decisions and/or comparisons as indicated in step 806. Next, in step 808, the web browser 304 may be configured to present a recommended service to an operator of the image client device 302.

It is worth noting that when using the first exemplar web-based imaging system 300 illustrated in FIG. 3, the above description is accurate. However, in the second exemplar web-based imaging system 400 illustrated in FIG. 4, the imaging information is accessed from the web server 312 rather than the web browser 304. The information gathered about the imaging information is used to synthesize the appropriate web content 314 to be delivered to the web browser 304. Keep in mind that web content 314 includes content in the browser 304 and content in the web server 312. Web content 314 on the web server 312 is often used to synthesize different web content 306, which is delivered to the web browser 304.

As illustrated in the query of step 810, the operator may be prompted to choose whether to use the recommended service. When the operator indicates that he or she desires to use the recommended service, the web browser 304 may link the appropriate task description and personal imaging repository information to the recommended service provider as shown in step 814.

In preferred embodiments, the user's personal imaging repository 214 would be used to convey information about user context between the services. The user has a "virtual order" or user information profile, which web-based services can somehow access (the method by which the "virtual order" is accessed varies depending on whether client side or server side identity is being employed). This "virtual order" or user information profile can provide various remote services such as remote service 650 with information about the user, such as, which document the user is currently trying to print (i.e., the "selected document" or "default composition") and what the most recently selected collection of settings the user associated with that document. The "virtual order" or user information profile may be implemented via a personal imaging repository 214. In some embodiments, the "virtual order" may include information resident within the imaging client device 302 in addition to information resident within the personal imaging repository 214.

Otherwise, the web browser 304 may be configured to present one or more service options to the user of the imaging client device 302 as illustrated in step 812. Once the web browser 304 has successfully communicated with the service provider, the web browser may be configured to prompt the user whether more tasks are desired as illustrated in the query of 816. When the response to the query of step 816 is affirmative, steps 802 through 816 may be repeated as desired. Otherwise, when the response to the query of step 816 indicates that the user has exhausted his or her hardcopy generation tasks, the web browser 304 may be configured to terminate the method 800.

It should be emphasized that the above-described embodiments, particularly, any "preferred" embodiments, are merely possible examples of implementations, merely set forth for a clear understanding of the principles of the systems and methods for intelligent routing. Many variations and modifications may be made to the above-described embodiment(s) of the systems and methods for intelligent routing without departing substantially from the spirit and principles thereof. All such modifications and variations are intended to be included herein within the scope of this disclosure and the system and method for intelligent routing as protected and set forth by the following claims.

Having thus described the systems and methods for intelligent routing, we claim the following:

1. A method for intelligently routing hard-copy generation tasks, comprising:
   accessing imaging service data from a network connected computing device;
   accessing imaging data from at least one store, via the network and using an imaging extension, to generate at least one criterion; and
   recommending at least one hard-copy generation service capable of performing a particular hard-copy generation task matching the at least one criterion,
   wherein recommending comprises presenting a plurality of user selectable destinations; and wherein the at least one criterion identifies a parameter range comprising a measure of color information.

2. The method of claim 1, further comprising:

initiating a hard-copy generation request.

3. The method of claim 1, wherein accessing imaging service data comprises retrieving logic.

4. The method of claim 1, wherein accessing imaging service data comprises retrieving content descriptors.

5. The method of claim 1, wherein accessing imaging data comprises retrieving imaging data from the at least one store.

6. The method of claim 1, wherein accessing imaging data comprises retrieving a scaled-down version of a document.

7. The method of claim 1, wherein recommending depends on both the imaging service and the imaging data.

8. The method of claim 1, wherein the imaging extension comprises part of a user browser.

9. The method of claim 1, wherein the imaging extension comprises logic received from the imaging service data.

10. The method of claim 1, wherein recommending further comprises presenting information describing the network location of each of the plurality of user selectable destinations.

11. A method for assisting a user in selecting a hardcopy generation service, comprising:

accessing imaging data stored in a personal image repository using an imaging extension;

formulating at least one criterion reflective of the imaging data;

accessing information reflective of a plurality of hardcopy generation services;

using the at least one criterion to identify hardcopy generation services; and recommending the identified hardcopy generation services to the user;

receiving a user preference; and identifying at least one recommended service responsive to the user preference;

wherein the at least one criterion identifies a parameter range comprising a measure of color information.

12. The method of claim 11, further comprising:

initiating a hard-copy generation request.

13. The method of claim 11, wherein the hard-copy generation services are coupled via the wide area network commonly known as the Internet.

14. The method of claim 11, wherein the hard-copy generation services are coupled via a local area network.

15. The method of claim 11, wherein the parameter further comprises a measure of the size of a document.

* * * * *